United States Patent [19]

Fueller et al.

[11] Patent Number: 5,487,564
[45] Date of Patent: Jan. 30, 1996

[54] FASTENING DEVICE FOR A DEFLECTING FITTING

[75] Inventors: Peter Fueller; Juergen Kuebler; Herbert Guett; Franz Amaseder, all of Munich, Germany

[73] Assignee: Bayerische Motoren Werke Aktiengesellschaft, Munich, Germany

[21] Appl. No.: 278,908

[22] Filed: Jul. 22, 1994

[30] Foreign Application Priority Data

Jul. 23, 1993 [DE] Germany ............ 43 24 785.7

[51] Int. Cl.⁶ .................... B60R 22/18; B60R 22/12; B60R 21/13
[52] U.S. Cl. .......................... 280/808; 280/756
[58] Field of Search .................. 280/801.1, 808, 280/756

[56] References Cited

U.S. PATENT DOCUMENTS

| | | | |
|---|---|---|---|
| 3,292,726 | 12/1966 | Jette, Jr. | 280/756 |
| 4,848,835 | 7/1989 | DeRees | 280/756 |
| 5,176,402 | 1/1993 | Coulon | 280/808 |
| 5,306,044 | 4/1994 | Tucker | 280/801.1 |
| 5,318,337 | 6/1994 | Götz et al. | 280/756 |

FOREIGN PATENT DOCUMENTS

| | | |
|---|---|---|
| 1596634 | 7/1970 | France. |
| 2529000 | 3/1976 | Germany. |
| 2747398 | 5/1978 | Germany. |
| 2113579 | 8/1982 | Germany. |
| 8523831.7 | 11/1985 | Germany. |
| 8526894.1 | 1/1986 | Germany. |
| 3723378 | 1/1989 | Germany ............ 280/756 |
| 3822461 | 1/1990 | Germany. |
| 3924969 | 2/1990 | Germany. |
| 4102329 | 8/1991 | Germany. |
| 4003941 | 8/1991 | Germany. |
| 3922509 | 3/1993 | Germany. |
| 4211965 | 4/1993 | Germany. |

OTHER PUBLICATIONS

German Search Report 43 24 785.7, Jan. 5, 1994.

*Primary Examiner*—Kenneth R. Rice
*Attorney, Agent, or Firm*—Evenson, McKeown, Edwards & Lenahan

[57] ABSTRACT

A fastening device for a deflection fitting of a safety belt arrangement is disclosed for a vehicle with a body which is open at the top. The fastening device includes a hollow tube which extends through a horizontal vehicle partition and, on the one side, is welded in the area of this partition to a transverse member and, on the other side, is welded to a vehicle side member below the partition. The fastening device may be manufactured at low cost and may be inserted in the vehicle body, requires little space and causes an additional stiffening of the rear area of the vehicle body. In a particularly advantageous manner, the free cross-section of the hollow tube is suitable for receiving a rollover protection device which may consist either of a fixedly screwed-in system or of a system which can be selectively moved out. The hollow tube can also receive wind screen support devices and lifting or swivelling mechanisms.

17 Claims, 4 Drawing Sheets

FASTENING DEVICE FOR A DEFLECTING FITTING

BACKGROUND AND SUMMARY OF THE INVENTION

This invention relates to a fastening device for a deflection fitting of a safety belt arrangement in a vehicle with a vehicle body which is open on top, the fastening device being arranged behind a seat in a rear portion of the vehicle body and extending above an approximately horizontally aligned partition of the vehicle body.

A fastening device of the initially mentioned type is known from German Patent Document DE 39 24 969 C2. One fastening device respectively of this type is arranged behind the two seats of a vehicle on a partition (rearward floor panel) which separates the vehicle interior from the rear-axle installation area. The truncated-pyramid-type fastening devices comprise four sheet metal plates and accommodate a deflection fitting for a safety belt on their top side.

A disadvantage of this known construction is the fact that the built fastening device comprises a large number of component parts. The sheet metal plates which are partially bent in a complicated manner require a time-consuming and cost-intensive manufacturing and mutual connecting. Since, in the case of a crash, the deflection fitting must absorb high forces in the driving direction, a large supporting base on the partition and therefore a correspondingly large overall space are required for the known fastening device.

It is an object of the invention to avoid the disadvantages of the known fastening device of the above-mentioned type.

This object is achieved according to preferred embodiments of the invention by providing an arrangement wherein the fastening device is formed by a hollow tubular member which extends through an upwardly facing opening of the partition and extends below the partition, said tubular member being connected at a first connection location in an area of the opening of the partition and at a second connection location at a support extending below the partition.

It is an important aspect of the invention to use, instead of a built fastening device, a prefabricated hollow section which is not supported in a horizontal plane on the rear portion of the vehicle but "goes downward" instead. The required large supporting base is achieved by the two vehicle body linking points which are vertically disposed above one another (top: passage opening in the partition; bottom: support).

A number of advantages are achieved in this manner: Hollow sections of a corresponding stiffness and stability are low in price and can be manufactured individually corresponding to the requirements, for example, by means of extruding. When conventional profile sections are used, special cost advantages can be achieved. The prefabricated hollow sections can simply be inserted in the vehicle body. As a result, short mounting times and low costs will be involved. Because the fastening device extends in the vertical direction, the space requirement in the interior of the vehicle is very low. In addition, the connection of the partition and the lower support results in an additional increase of the torsional rigidity of the vehicle body.

The hollow section may have a circular, rectangular, elliptical or other cross-section. The cross-section and/or wall thickness may be constructed to be constant or variable along the longitudinal course of the hollow section.

As a rule, the horizontal partition is the continuation of the sloped sheet metal wall situated behind the seats and separates the area of the rear window shelf or of the folding-top compartment in the vehicle interior from the installation area for the rear axle, fuel tank, etc. on the exterior side of the vehicle.

In certain advantageous preferred embodiments of the invention, the fastening device is connected "on top" with a support inserted in the area of the partition for reinforcing the vehicle body. As a rule, this is a transverse member which is provided for reasons of the torsional resistance of the vehicle body, which transverse member extends, for example, at the forward end portion of the partition. As a result of the linking to this support, an additional reinforcement in the area of the passage opening for the connection between the hollow section and the partition will not be necessary, which leads to advantages with respect to cost and weight. In the case of flat contact surfaces of the support and the hollow profile, for example, by means of welding, a simple and highly stressable connection is possible without any additional connecting elements.

Also in preferred embodiments of the invention, a side member which exists in the vehicle body anyhow and which is constructed to be correspondingly stiff is used for the "lower" supporting of the fastening device. The side member may, for example, originate from the lateral member and may be constructed in its further course for accommodating the rear axle or the trunk bottom. The possibility therefore arises to include the fastening device in a low-cost and weight-saving construction at low expenditures into the vehicle body in such a manner that the introduction of high forces is possible. It is an additional advantage in this case that as a result of the connection of the two planes disposed above one another, by means of the fastening device, the torsional rigidity in the area of the vehicle rear is increased considerably which is very desirable, specifically in the case of vehicles with a vehicle body which is open on top. Closed hollow-section cross-sections, particularly circular tube cross-sections, are ideally suited in this case for absorbing torsional stress.

Particularly advantageous preferred embodiments of the invention provide for a double function of the fastening device. If the deflection fitting and the belt retractor are fastened outside the hollow-section cross-section, the interior of the hollow section is free for accommodating a rollover protection device. Thus, no additional device is necessary for this purpose. As a result, considerable advantages are achieved with respect to manufacturing costs, weight and installation space. The hollow section provides an extremely stiff guide which extends along a large length in the vertical direction and is stiffly anchored in the vehicle body, virtually without any additional costs and without any additionally required space.

The rollover protection device can be constructed to be either firmly connected with the hollow section or so that it can be moved out. A fixedly installed rollover protection device may advantageously also be retrofitted without any significant additional expenditures. After the removal of a part of the covering, a rollover protection device which is congruent with respect to the hollow section may simply be fitted into the hollow section and connected, for example, screwed together with it. In the case of a correspondingly large overlapping, this results in an additional stiffening of the hollow section.

If the rollover protection device is to be displaceable in the vertical direction, for example, for reasons of appearance or because a folding top does not permit a sufficient height of a rigid rollover protection device. The hollow section may advantageously be used as a guide for a rollover protection device. The drive for the rollover protection device may be arranged outside the hollow section (for example, as known from U.S. Pat. No. 3,292,726 A) or may be integrated into the hollow section (coil springs, pyrotechnics).

As a rule, the fastening devices are each arranged on the outside behind the seats or a row of seats. The rollover protection device in the fastening devices may comprise two separate individual devices or may be connected, for example, by way of a cross strut, to form a rollover bar.

In addition to being used for a rollover protection device, the hollow section, which is open toward the top, may also be used as a receiving and guiding means for additional devices, such as a wind screen device or a lifting and/or swivelling mechanism.

According to certain preferred embodiments, a separate fastening device for a windscreen arrangement will not be required which results in advantages with respect to space and costs. Windscreen arrangements are used for the reduction of air turbulence in the passenger compartment in the case of open vehicles and, as a rule, comprise a rectangular frame, which extends along the inner width of the vehicle and has a net-type covering. These windscreen arrangements are mounted behind the vehicle occupants. If the vertical lateral frame parts of the windscreen are lengthened in the downward direction and with respect to the cross-section are constructed corresponding to the hollow section of the fastening device according to the invention, as required, the windscreen can be fitted into the hollow sections in a simple manner and at a point which is favorable with respect to the flow. For this purpose, the hollow sections must only be provided with removable plugs which, in a visually attractive manner may be integrated, for example, into a covering which covers the fastening devices.

Analogously, according to certain preferred embodiments, a lifting and/or swivelling mechanism may be inserted into the hollow section of the fastening device. Lifting and/or swivelling mechanisms of this type facilitate the bringing-in of loads or make it easier for persons to enter the vehicle, for example, for persons whose ability to move is impaired. Such a lifting and/or swivelling mechanism may be designed, for example, in an L-shape, in which case the vertical leg of the mechanism is inserted into the hollow section which preferably has a circular cross-section, and at the free end of the horizontal leg, a, for example, pulley-block-type lifting mechanism is provided.

Other objects, advantages and novel features of the present invention will become apparent from the following detailed description of the invention when considered in conjunction with the accompanying drawings.

BRIEF DESCRIPTION OF THE DRAWINGS

FIG. 5 is a perspective view of a wind screen device according to a preferred embodiment of the invention; and FIG. 6 is a perspective view of a lifting and swiveling mechanism according to a preferred embodiment of the invention.

DETAILED DESCRIPTION OF THE PREFERRED EMBODIMENTS

Figure 1:
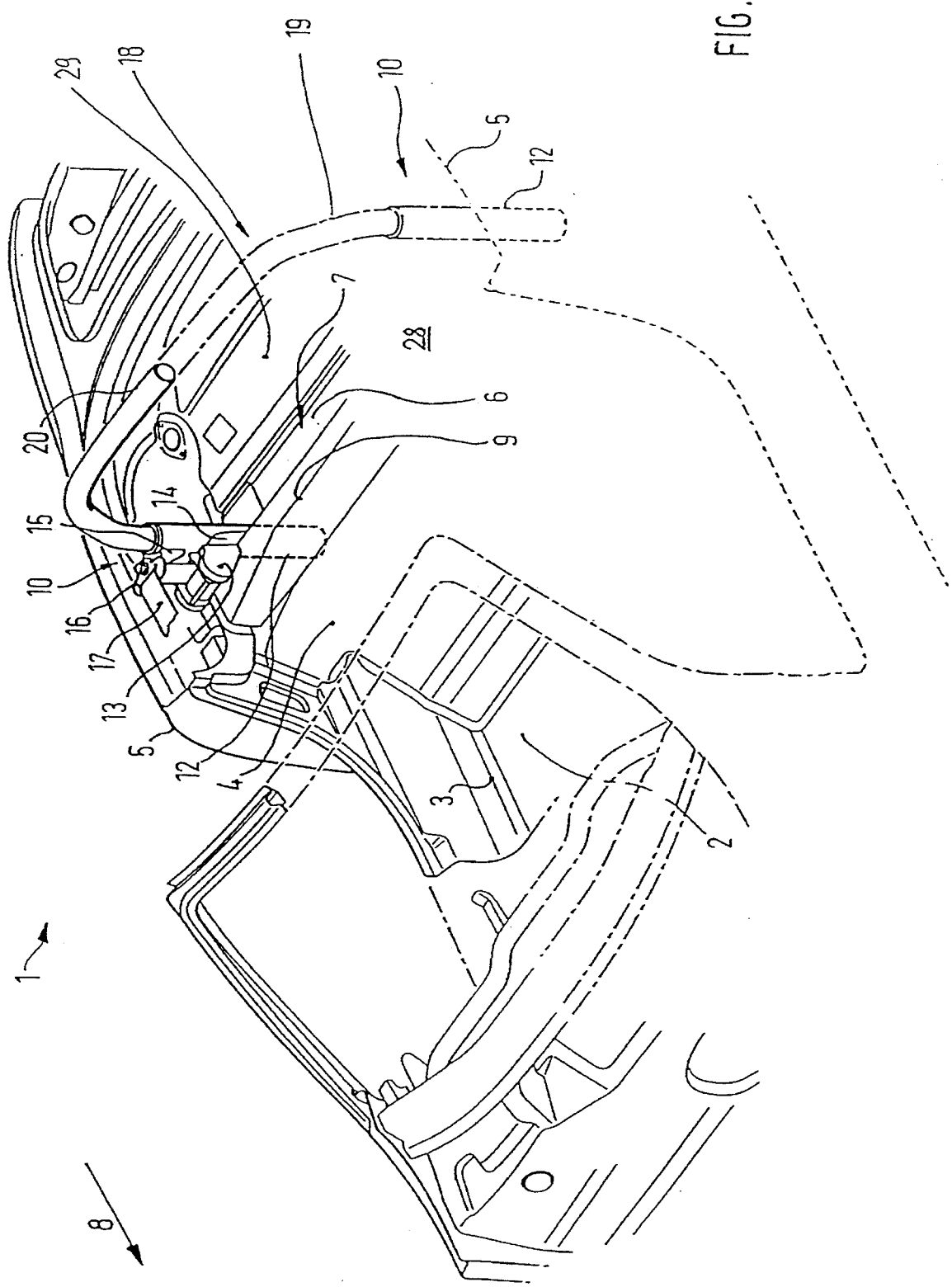
FIG. 1 is a perspective view of a vehicle body of a convertible vehicle which is open on top and has safety belt fastening devices constructed according to a preferred embodiment of the invention.

FIG. 1 illustrates the body 1 of a two-seater vehicle which is open on top, mainly only the right vehicle area being shown. The seats for the driver and the front passenger, which are not shown, are arranged on a floor panel 2. The vehicle body 1 is reinforced by lateral side members 3. A rear wall 4, which is sloped toward the rear with respect to the vertical line, merges below the upper end section of the rear side parts 5 into a horizontal partition 6.

The partition 6 separates the area of the rear window shelf or of the compartment 7 for the foldable top on the inside of the vehicle from the area 28 on the outside of the vehicle in which, for example, the tank and the rear axle are arranged. Toward the rear, the partition 6 merges into the upwardly directed boundary wall 29 of the top compartment 7. Also, the boundary wall 30 for the trunk 31 adjoins toward the rear bottom (see FIG. 2). In its forward area, the partition 6 is reinforced by a transverse member 9 which extends transversely with respect to the driving direction 8.

Behind the two seats and on their exterior side, one fastening device 10 according to the invention respectively extends through the partition 6 in such a manner that it is supported on a side member 11 (illustrated in FIGS. 2 to 4) extending below the cross member 9 as well as on the cross member 9 itself. In its further course, the side member 11 is used for accommodating a rear axle which is not shown.

The fastening device 10 consists essentially of a hollow section in the form of a tube 12 with a circular cross-section. On the front side of the tube 12, a belt retractor 13 is fastened in the area of the transverse member 9. The connection between the tube 12 and the transverse member 9 takes place by way of an intermediate metal sheet 14 which also carries the belt retractor 13. On the upper end portion of the tube 12, a deflection fitting 16 is fastened also on its front side by way of a console 15. By means of this deflection fitting 16, a belt strap 17 is guided in an ergonomically favorable manner to the shoulder of the vehicle occupant. The fastening of the deflection fitting 16 may also take place directly on the tube 12 according to other contemplated embodiments.

A bar-shaped rollover protection device 18, which comprises two legs 19 and a cross strut 20, is inserted into the cross-sections of the tubes 12 which are open on top.

Figure 2:
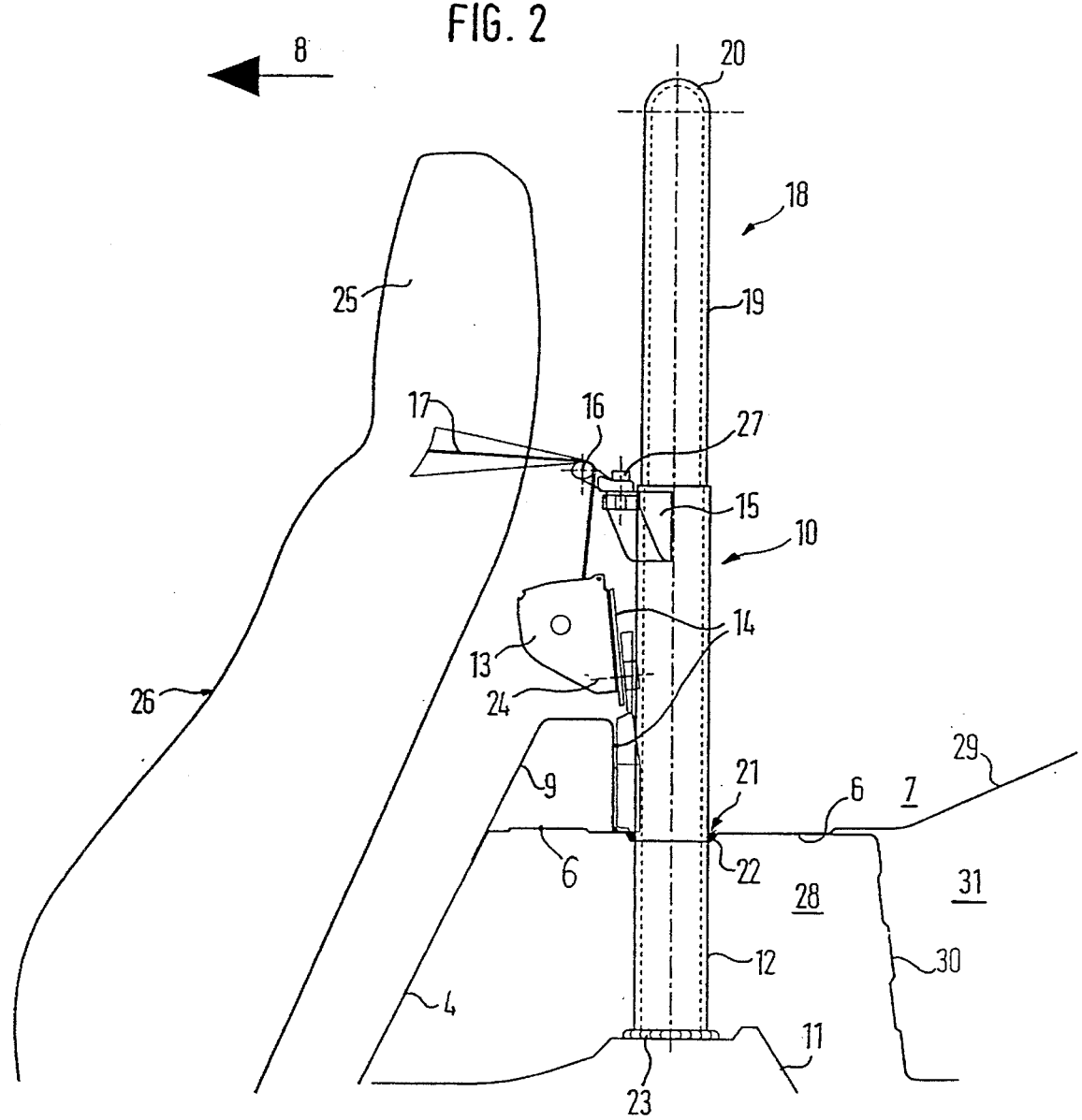
FIG. 2 is an enlarged schematic representation of the left fastening device according to the invention with associated vehicle body part area.
Figure 3:
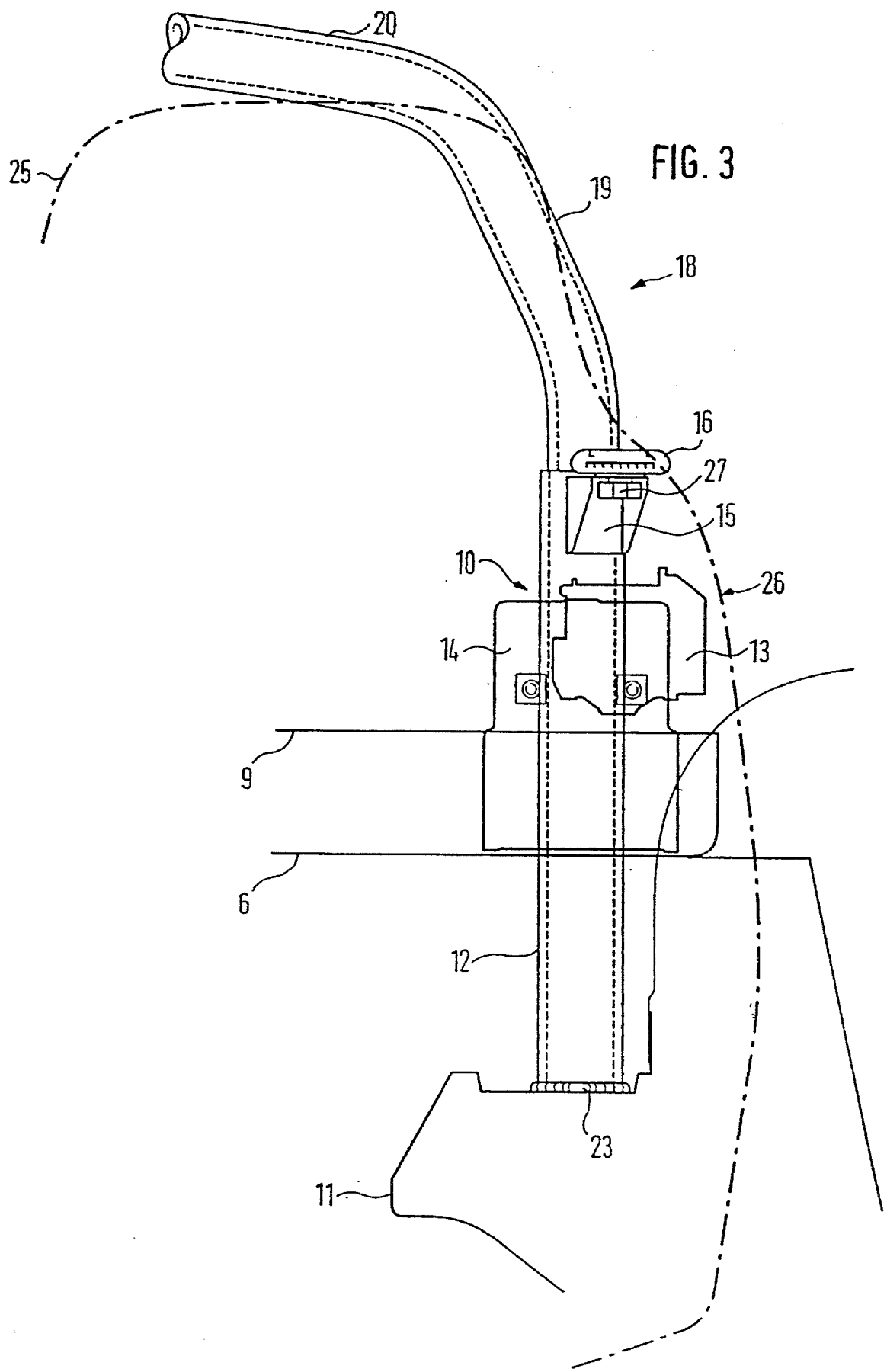
FIG. 3 is a view of the arrangement of FIG. 2 taken against the driving direction of the vehicle.
Figure 4:
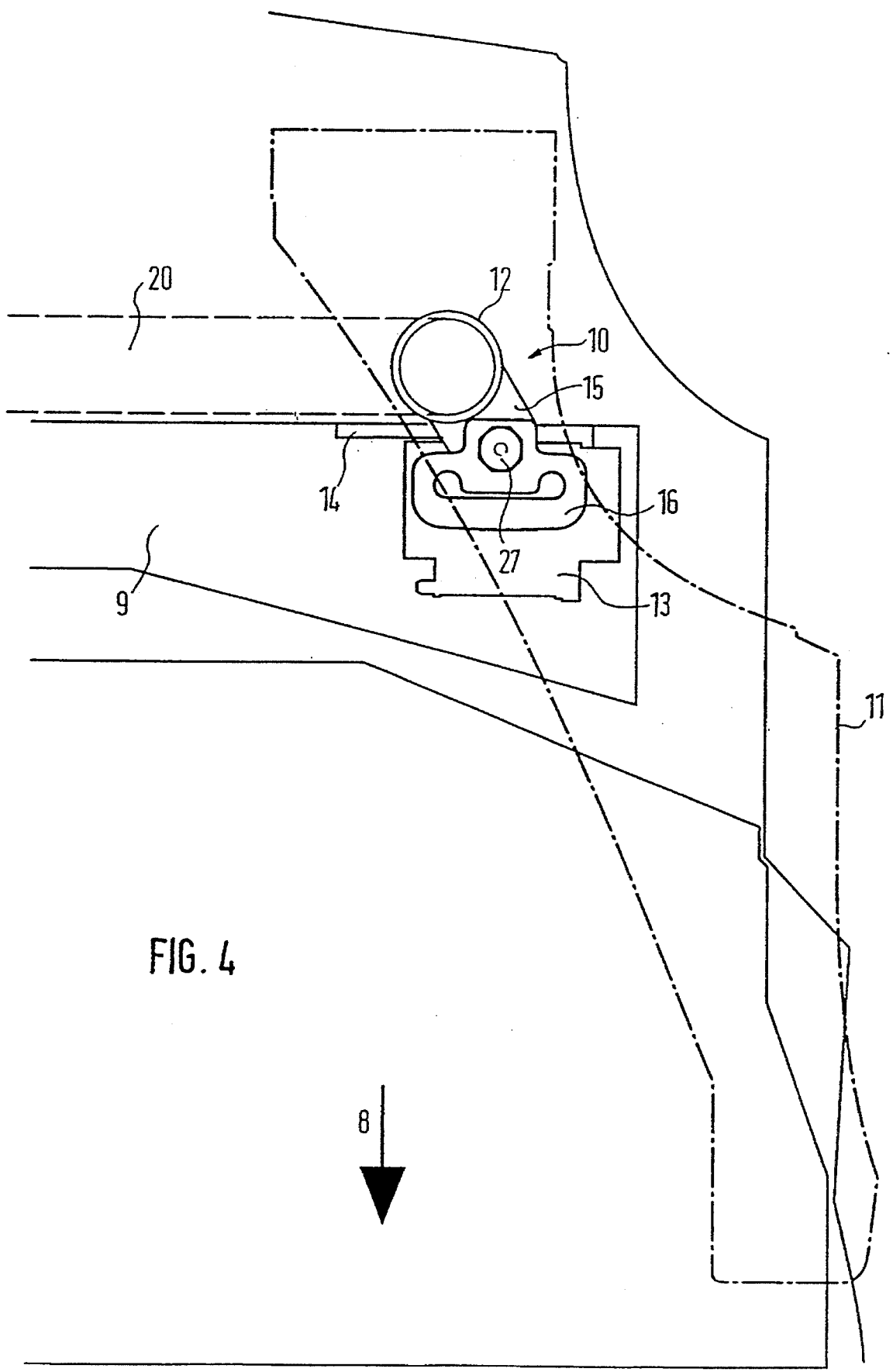
FIG. 4 is a top view of the arrangement of FIG. 2.

FIGS. 2 to 4 show the left fastening device 10 and its linking to the vehicle body 1 in detail. For maintaining a clear representation, not all components mentioned in the specification were shown in all figures.

Tube 12 extends through an opening 21 in the partition behind the transverse member 9. The opening 21 is sealed off by an elastic seal 22. As an alternative, a closed weld seam along the opening 21 may be used. The fastening of the tube 12 on the transverse member 9 takes place by way of the intermediate metal sheet 14 also by means of welding. The belt retractor 13 is also screwed to the intermediate metal sheet 14 by means of a screw 24.

The lower end portion of the tube 12 is welded to the side member 11 by way of a surrounding weld seam 23. As an alternative to the weld seam 23, the tube 12 may be screwed to the side member 11. Likewise, it is contemplated according to certain embodiments to insert the tube 12 into a receiving device of the side member 11 and to fix it via weld points.

The tube 12 ends approximately at the height of the lower end section of the head rest 25 of a back rest 26 of the left seat. The console 15 is welded to this upper end portion of the tube 12. The deflection fitting 16 is connected with the console 15 by means of a screw 27.

The left leg 19 of the rollover protection device 18 is inserted into the tube 12, in which case the outer diameter of the leg 19 is correspondingly adapted to the inside diameter of the tube 12.

The tube 12, the belt retractor 13, the intermediate metal sheet 14 and the console 15 are covered by means of a covering which is not shown and through which the deflection fitting 16 and the rollover protection device 18 are disposed.

FIG. 5 illustrates a wind screen device 32 mounted on the vehicle. FIG. 6 shows a lifting and swiveling mechanism 33 which is mounted on the vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fastening device for a guide fitting of a safety belt arrangement in a vehicle with a vehicle body which is open on top, the fastening device being arranged behind a seat in a rear portion of the vehicle body and extending above an approximately horizontally aligned partition of the vehicle body, wherein the fastening device is formed by a hollow section which passes through an opening of the partition and continues below the partition, said hollow section being connected at a first connection location in an area of the opening of the partition, and at a second connection location at a support extending below the partition.

2. A fastening device according to claim 1, wherein the hollow section is connected at the first connection location with a support member extending approximately at the level of the partition.

3. A fastening device according to claim 1, wherein the support which extends below the partition is constructed as a vehicle side member.

4. A fastening device according to claim 1, wherein the hollow section is configured to supportingly receive a rollover protection device.

5. A fastening device according to claim 4, wherein the hollow section is configured to be used as a guide for a rollover protection device which can be displaced in the vertical direction.

6. A fastening device according to claim 1, wherein the hollow section is configured to receive a wind screen device.

7. A fastening device according to claim 1, wherein the hollow section is configured to receive a lifting and swivelling mechanism.

8. A fastening device according to claim 2, wherein the hollow section is configured to supportingly receive a rollover protection device.

9. A fastening device according to claim 3, wherein the hollow section is configured to supportingly receive a rollover protection device.

10. A fastening device according to claim 9, wherein the hollow section is configured to be used as a guide for a rollover protection device which can be displaced in the vertical direction.

11. A fastening device according to claim 2, wherein the hollow section is configured to receive a wind screen device.

12. A fastening device according to claim 3, wherein the section is configured to receive a wind screen device.

13. A fastening device according to claim 2, wherein the hollow section is configured to receive a lifting and/or swivelling mechanism.

14. A fastening device according to claim 3, wherein the hollow section is configured to receive a lifting and swivelling mechanism.

15. A fastening device according to claim 8, wherein the hollow section is configured to be used as a guide for a rollover protection device which can be displaced in the vertical direction.

16. A fastening device according to claim 1, wherein said hollow section is immovably connected at said first and at said second connection locations.

17. A fastening device according to claim 16, wherein said hollow section is welded at said first and at said second connection locations.

* * * * *